(12) United States Patent
Crick et al.

(10) Patent No.: US 7,765,275 B2
(45) Date of Patent: Jul. 27, 2010

(54) CACHING OF PRIVATE DATA FOR A CONFIGURABLE TIME PERIOD

(75) Inventors: Darl Andrew Crick, Keswick (CA); Joseph Bing Kong Fung, Toronto (CA); Darshanand Khusial, Mississauga (CA); Andon Salvarinov, Vancouver (CA); Barbara Chow Yee Wong, North York (CA)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/341,651

(22) Filed: Jan. 27, 2006

(65) Prior Publication Data

US 2007/0180048 A1      Aug. 2, 2007

(51) Int. Cl.
*G06F 15/16* (2006.01)
(52) U.S. Cl. .................... 709/217; 709/228; 709/229
(58) Field of Classification Search ................. 709/228, 709/229, 217
See application file for complete search history.

(56) References Cited

U.S. PATENT DOCUMENTS

| | | | |
|---|---|---|---|
| 5,875,296 A * | 2/1999 | Shi et al. ................. | 726/5 |
| 6,078,956 A * | 6/2000 | Bryant et al. ............ | 709/224 |
| 6,748,386 B1 | 6/2004 | Li ........................... | 707/10 |
| 6,775,291 B1 | 8/2004 | Ryu et al. | |
| 7,237,118 B2 * | 6/2007 | Himberger et al. ....... | 713/182 |
| 7,461,262 B1 * | 12/2008 | O'Toole, Jr. ............. | 713/182 |
| 2002/0004832 A1 * | 1/2002 | Yoon et al. ............... | 709/229 |
| 2002/0007402 A1 * | 1/2002 | Huston et al. ........... | 709/217 |
| 2002/0111942 A1 * | 8/2002 | Campbell et al. ......... | 707/3 |
| 2003/0115421 A1 | 6/2003 | McHenry et al. .......... | 711/133 |
| 2003/0233423 A1 | 12/2003 | Dilley et al. ............. | 709/214 |
| 2004/0015538 A1 | 1/2004 | Agarwalla et al. ....... | 709/203 |
| 2004/0111621 A1 | 6/2004 | Himberger et al. | |
| 2004/0133538 A1 | 7/2004 | Amiri et al. .............. | 707/1 |
| 2005/0050067 A1 * | 3/2005 | Sollicito et al. ........... | 707/100 |
| 2006/0036875 A1 * | 2/2006 | Karoubi .................... | 713/191 |

(Continued)

FOREIGN PATENT DOCUMENTS

CN         1286443 A       3/2001

(Continued)

OTHER PUBLICATIONS

Park, J; Sandhu, R, Secure cookies on the web, Jul. 2000, IEEE, vol. 4, pp. 1-9.*

(Continued)

*Primary Examiner*—Wing F Chan
*Assistant Examiner*—Hitesh Patel
(74) *Attorney, Agent, or Firm*—Lee Law, PLLC; Christopher B. Lee

(57) ABSTRACT

A computer implemented method, apparatus, and computer program product for generating cookies. A cookie value is retrieved in response to receiving the request. An expiration for the cookie value is set based on a time period in which the request is received. A set of unique identifiers, including the expiration, are added to the cookie value and a cookie name to form a cookie. A response to the request is sent to an intermediate server. The response includes data responsive to the request and the cookie. The validity of the data for the response is related to the expiration.

16 Claims, 5 Drawing Sheets

U.S. PATENT DOCUMENTS

2007/0005779 A1 * 1/2007 Yao et al. ............... 709/228

FOREIGN PATENT DOCUMENTS

| CN | 1057203 A | | 6/2004 |
|---|---|---|---|
| EP | 1783634 A1 | * | 5/2007 |

OTHER PUBLICATIONS

Li, et al., "Challenges and Practices in Deploying Web Acceleration Solutions for Distributed Enterprise Systems", 004, May 2004, pp. 297-308.

"8 Simple Caching Rules, Web Caching your Applications for Fast Response Time", An Oracle Technical White Paper, Supplementary to Oracle OpenWorld Technical Session, Dec. 2004, pp. 1-11.

Bakalova et al., "WebSphere Dynamic Cache: Improving J2EE application performance", IBM Systems Journal, vol. 43, No. 2, 2004, pp. 351-370.

Mohan, "Caching Technologies for Web Applications", VLDB, Rome, Sep. 2001, almaden.ibm.com/u/mohan/Caching_VLDB2001.pdf, pp. 1-31.

Rabinovich et al., "Moving Edge-Side Includes to the Real Edge—the Clients", research.att.com/~misha/otherPubs/csi.pdf, retrieved Dec. 20, 2005, pp. 1-14.

"Advanced Cache Control", Akamai Feature, 2003, Akamai Technologies, Inc., pp. 1-2.

"Caching In on the Enterprise Grid, Turbo-Charge Your Applications with OracleAS Web Cache", An Oracle Technical White Paper, Dec. 2004, pp. 1-34.

* cited by examiner

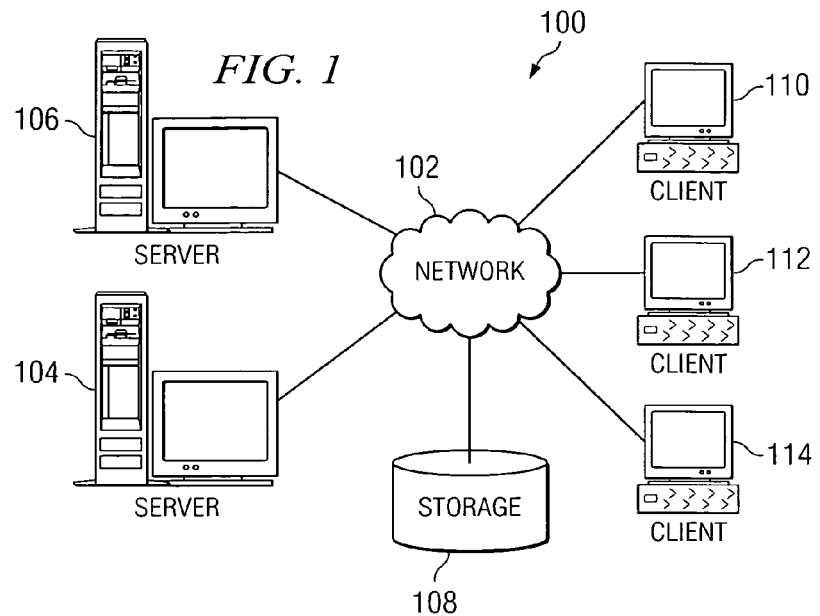
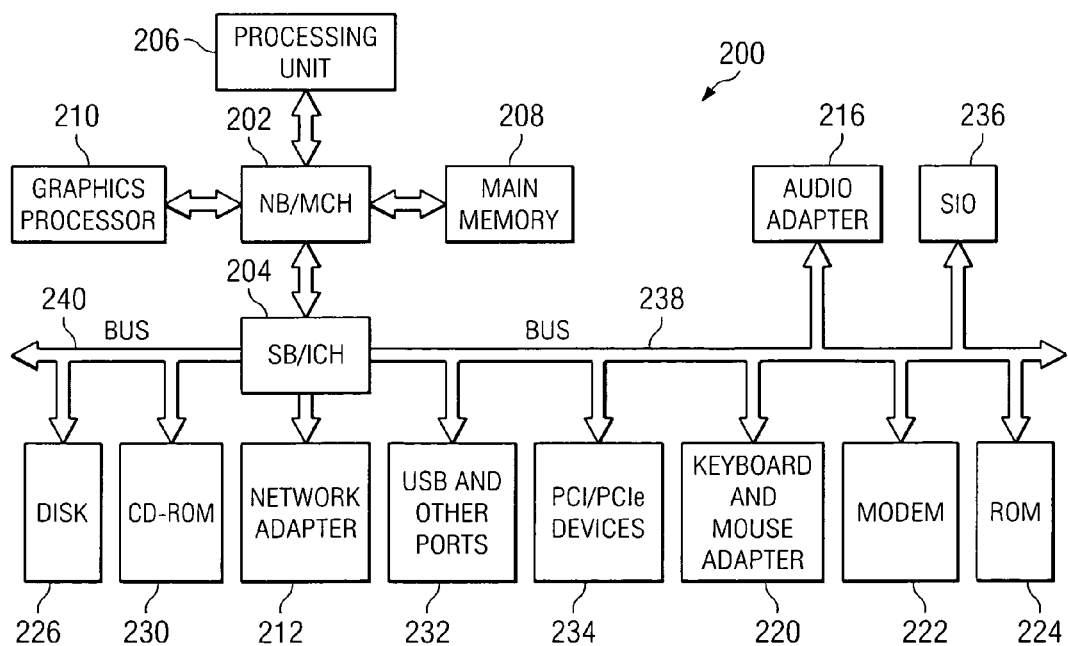

FIG. 8

```
procedure ProcessRequest                                          800
    Get New Request
    If EdgeServerCookies not found {
        Call generateEdgeServerCookies
    }else if current StoreId is not substring of each found EdgeServerCookies Name {
        Erase found EdgeServerCookies
        Call generateEdgeServerCookies
    }else if ContextChanged == true {
        Call generateEdgeServerCookies
    }
    write cookies in the response
endproc
```
— 802

```
procedure generateEdgeServerCookies
    for each EdgeServerCookieName in the config do {
        get the current timeperiod
        if TimePeriod has changed {
            stop creating EdgeServerCookies
        }
        get the cookie value
        concatenate the storeId to the CookieName
        concatenate the TimePeriod to the CookieValue
        concatenate the MechantId to the CookieValue
        hash the CookieValue
        set the expiring time of the Cookie as EndOfTimePeriod - CurrentTime
        write the cookie in the Response
    }
endproc
```
— 804

US 7,765,275 B2

CACHING OF PRIVATE DATA FOR A CONFIGURABLE TIME PERIOD

BACKGROUND OF THE INVENTION

1. Field of the Invention

The present invention relates generally to data processing, and in particular to a computer implemented method and apparatus for caching data. Still more particularly, the present invention relates to a computer implemented method, apparatus, and computer program product for creating and linking constrained cookies and a set of data.

2. Description of the Related Art

Reliance on data processing systems has grown exponentially in recent years because of the increased use of computing devices in every aspect of business and society. In many cases, users access information and data using a network or over the Internet. In order to maximize productivity, users need to be able to quickly and easily access information through a web application.

In many cases, user requests and responses are sent through various servers. For example, a Web application server may be used to run a Web application. A Web server may be used to process static data and transfer business logic requests to the application server. An edge server is an intermediate processing server that may provide a caching functionality based on request parameters and cookies related to the request. Industry practice is to place the edge server geographically closer to the end user, to decrease response latency, and prevent excessive data traffic toward the web application server site. The edge server may cache data in close proximity to the client, improving the overall performance of the web application site.

By definition, an edge server has no computational capability and implements very rudimentary caching rules. The position of the edge server limits the edge server's caching abilities to be defined only on a set of cookies arriving with the client request. As a result of these limitations, the edge server has no capacity to provide computational power and logic in the caching decisions, initiate cookie management for a request, or provide secure data management for a request cookie.

Because of these limitations, the edge server is incapable of resolving requests for sensitive information in a secure way. For example, the edge server is incapable of preventing a replay attack, wherein a hostile user intercepts a valid request and replays the request later to obtain the same output as the original valid call. The inability to manage and process the incoming requests prevents any form of identity verification to be performed by the edge server. As a result, cached information stored on the edge server is limited to privacy insensitive information. As a result, the performance improvements available by caching information on the edge server are limited by security considerations.

BRIEF SUMMARY OF THE INVENTION

The aspects of the present invention provide a computer implemented method, apparatus, and computer program product for generating cookies. A cookie value is retrieved in response to receiving the request. An expiration for the cookie value is set based on a time period in which the request is received. A set of unique identifiers, including the expiration, are added to the cookie value and a cookie name to form a cookie. A response to the request is sent to an intermediate server. The response includes data responsive to the request and the cookie. The validity of the data for the response is related to the expiration.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the aspects of the present invention may be implemented;

FIG. 2 is a block diagram of a data processing system in which aspects of the present invention may be implemented;

FIG. 8 is pseudocode for the processes of FIGS. 6 and 7 in accordance with an illustrative embodiment of the present invention.

DETAILED DESCRIPTION OF THE INVENTION

Figure 3:
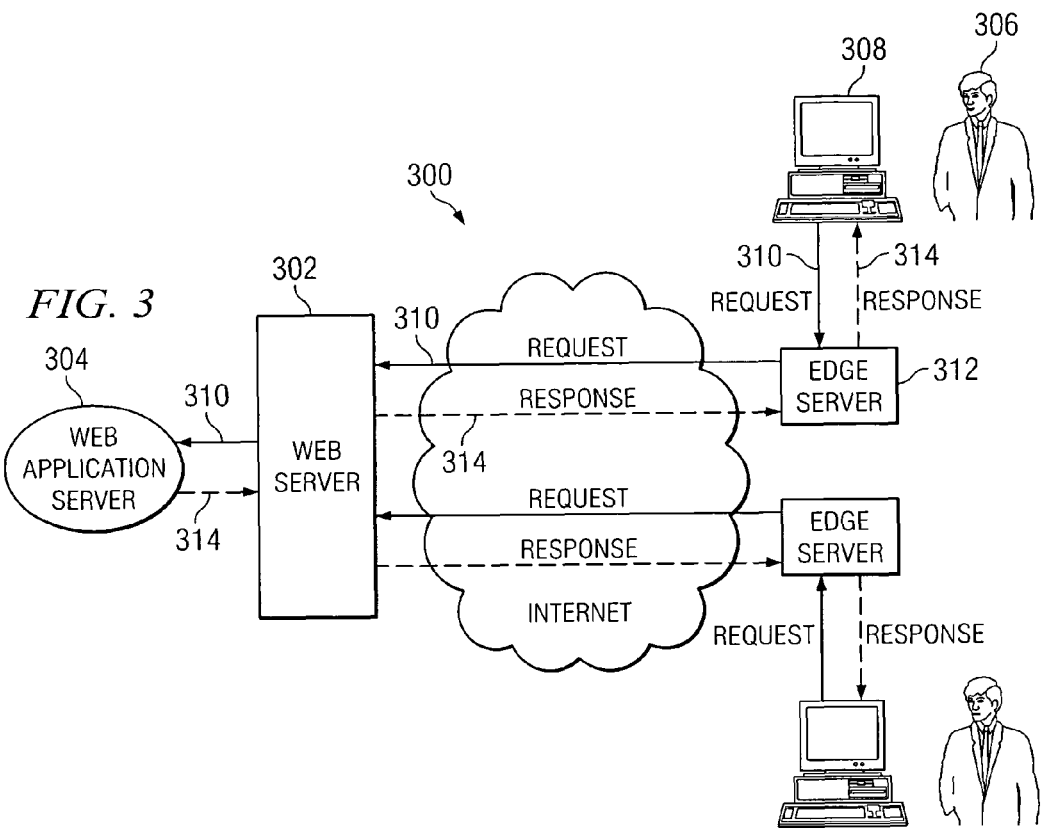
FIG. 3 is a pictorial representation of a network system in which aspects of the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer useable or readable medium may be utilized. The computer-usable or computer-readable medium may be, for example but not limited to, an electronic, magnetic, optical, or semiconductor system, apparatus, device. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled interpreted, or otherwise processed in a suitable manner, if necessary, and then stored in a computer memory.

In the context of this document, a computer-usable or computer-readable medium may be any medium that can store, the program for use by or in connection with the instruction execution system, apparatus, or device.

Computer program code for carrying out operations of the present invention may be written in an object oriented programming language such as Java™, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer program product for caching data. In these examples, the aspects of the present invention are implemented in an intermediate server. An intermediate server is a physical computer located between the client computer and the server computer processing requests for the client computer. Intermediate servers are preferably located physically closer to an end-user than a web application server and are used to pass requests and responses. The intermediate server may provide caching functionality based on request parameters and cookies related to the request. The intermediate server may be used for numerous tasks including caching, load balancing, and routing. In these examples, the intermediate server is referred to as an edge server, a server used to cache data by using a mechanism for constrained cookie generation and maintained by the web application server.

The different aspects of the present invention compensate for lack of computational logic and identity verification mechanisms in current edge servers. The aspects of the present invention extend the cookies with system generated information. The various references to a cookie or cookies refer to a set of cookies including one or more cookies.

The system generated information may include an expiration time period for defining when the response becomes invalid and other unique identifiers used to distinguish the cookie based on information such as web application identification, web application segment, language identification, store identification, and merchant identification. The modified cookies provide stronger coupling between the data on the edge server and the web application server which better enhances overall security, protects sensitive information from malicious attacks, and results in an increased scope of cached information.

FIG. 3 is a pictorial representation of a network system in which aspects of the present invention may be implemented. Network system 300 is used by any number of users to access information at web server 302 and web application server 304. This information may be, for example, content, applications, and data. In these illustrative examples, user 306 may use client 308 to submit request 310 to web server 302. The request may initially be passed through any number of intermediate processing servers, such as edge server 312 before request 310 reaches web application server 304. Client 308, edge server 312, web server 302, and web application server 304 may be data processing systems, such as data processing system 200 of FIG. 2.

Edge server 312 is typically positioned in closer physical proximity to client 308. This type of positioning is used to improve transmission speed when accessing information from web application server 304. Web server 302 generates static content for request 310 before passing the portion of request 310 which includes dynamic data to web application server 304. Web application server 304 responds to request 310 by generating response 314. Response 314 includes the necessary data for request 310 and specialized cookies. In these examples, the cookies are constrained to limit the time in which they are considered valid to ensure that the cookies are related to the uniquely cached data in the general scope of the application. Additionally, web application server 304 caches response 314 and makes response 314 available to edge server 312. Edge server 312 caches response 314 and cookies accessing data and objects within response 314 so that subsequent requests that include the cookies may be answered by edge server 312.

Figure 4:
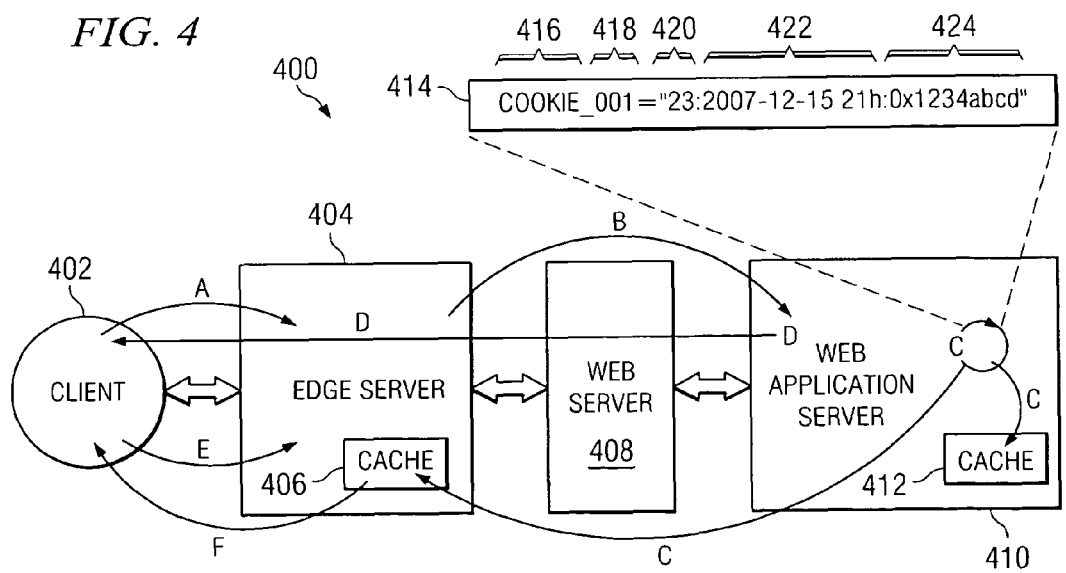
FIG. 4 is a flow diagram of a network system in which aspects of the present invention may be implemented.

FIG. 4 is a flow diagram of a network system in which aspects of the present invention may be implemented. Network system 400 may be a network system, such as network system 300 of FIG. 3. Network system 400 includes client 402, edge server 404, edge server cache 406, web server 408, web application server 410, and web application server cache 412.

Network system 400 may be used to implement any number of transactions, methods, or other forms of information retrieval. In one illustrative embodiment, network system 400 is used for Internet shopping. For example, client 402 may be an Internet shopper using a shopping web application accessible from web application server 410. In another example, network system 400 may be used by client 402 to retrieve education related grades or price lists of books from web application server 410.

Client 402 issues a request (step A). The request in step A may be generated by client 402 using a browser. For example, client 402 may have used a web browser to select a number of items for future purchases. Client 402 sends the request to web application server 410 without knowing of edge server 404. Edge server 404 sits in the path of the request and is completely transparent in communications between client 402 and web application server 410. When edge server 404 does not find cookies in the request the request passes through edge server 404 to web application server 410 (step B).

In step C, web application server 410 receives the request, processes the request, creates the output, generates cookies, and caches the response and cookies to web application server cache 412, and makes the response available to edge server cache 406.

Web application server 410 constrains the cookies based on system generated information. For example, web application server 410 divides time in the whole system into discrete time periods. The time periods may be of any duration depending on the sensitivity of the data accessed, application, and other factors. For example, discrete time periods may include seconds, minutes, hours, or even days. Web application server 410 links each newly generated cookie with a cookie expiration time corresponding to a discrete time period. The cached cookie content is invalidated at the end of the discrete time period which corresponds with the cookie expiration time. As a result, the cached content related to the cookie is time constrained because the content is only valid until the cookie expires. At expiration, cookies within the applicable expiration time are invalidated by web application server 410 at client 402 and edge server 404 so that the cookies may no longer be used to access the data in the response.

Web application server 410 further constrains the cookie by linking unique information and identifiers to the cookie name and value. For example, the cookie may be linked to the web application by concatenating a web application identification to the cookie value. The web application server may separate the cookies by web application segment by concatenating a web application segment identifier to the cookie name. By concatenating the web application identification, web application segment identifier, and other identifiers to the cookie, the cookie is constrained and encoded to prevent unauthorized or malicious attempts to retrieve private data.

Cookie 414 is an example of a cookie that may be generated during step C. In one example, the edge server cookie format may be further constrained using the following information: standard prefix 416 for the edge server cookies, the name of the information reference, such as a language identification, a unique number, such as a web application identification or a number defining a store identification in a commerce instance, an actual value contained in the cookie, a unique number defining a web application segment, and an integer number defined as a universal time coordinated (UTC) number divided by the number of milliseconds equal to the time period length. In addition, the entire value of the final cookie may be encrypted.

For example, standard prefix 416 of cookie 414 may be COOKIE. Web application server 410 may use web application segment 418 or subsection where cookie 414 is utilized to further generate the cookie name. Web application segment 418 is a portion of the web application which may operate independently from the rest of the web application. Each web application segment is associated with a unique number within the web application. By concatenating the name of the segment to the name of the cookie, the cookie and cached data is separated by web application segment 418 so that only data associated with a specific web application segment 418 may be cached at the edge server 404 using cookie 414. For example, three sections of a web application may be used to sell books, music, and videos in an ecommerce web application. If web application segment 418 number 001 is associated with books, we only want books to be cached on the edge server 404, so only web application segment 418 for books, 001, is concatenated to the cookie name.

For example, where web application segment 418 is 001, web application server 410 modifies the full cookie name to become COOKIE_001. Cookie 414 may also include language identification value 420. For example, the applicable language may be English with language identification value 420 of 23. The cookie name is modified by web application server 410 to become COOKIE_001="23".

Next, web application server 410 may determine active time period 422 in which cookie 414 will be active and valid. Active time period 422 is a discrete time period used to bind edge server caching rules with the web application server cookie content. For example, at the end of each time period, synchronization is forced on the cached data between edge server 404 and the web application running on web application server 410. The actual binding occurs at cookie creation by concatenating the current time period to the cookie data. As a result of concatenating active time period 422 to the cookie data, the edge server response exhibits dependency not only on the cookie content but also on a particular time period.

For example, if the time at cookie creation is 2007-12-25 21:15 h and the time period is set as one hour, the cookie time period is from 2007-12-25 21:00 h to 2007-12-25 22:00 h. Active time period 422 of cookie 414 will become 2007-12-25 21 h, and web application server 410 modifies the cookie name to become COOKIE_001="23: 2007-12-25 21 h".

Web application server 410 may use the time period to calculate the cookie expiration time by subtracting the current time from the end of time period. The cookie expiration time is governed by the time period in which cookie 414 was created. The cookie expiration time may be linked to the cookie content validity by setting the expiration time at the end of the current time period. As a result, cookie 414 expires at the end of the time period and may be replaced with a fresh cookie using the same method for cookie generation. At the end of the time period, the browser, used by client 402, may destroy or clear cookie 414 so that in any additional requests sent by client 402 to edge server 404 does not include cookie 414 in order to produce a cache hit. As a result, edge server 404 does not serve cached data but propagates the call to web application server 410. For example, the end of time period is 2007-12-25 22:00 h, and the current time is 2007-12-25 21:15 h. The expiration time is 45 minutes at which point the time period ends.

By using the time period and the cookie expiration time, expired cookies cannot be used in a reply attack to gain private information. A reply attack is a malicious request which tries to circumvent the existing security in order to gain access to private data from a system. The attack is an operation where the external source tries to intercept a valid request and reuse cookies present in the request at a later time to replay the request in order to steal the response information. In the case of replay attack, the cookies are forced to the edge server in an attempt to retrieve private data after the time period is expired. However, the edge server has flushed the cached data at the end of the time period, and the new cached data will not create a cache hit with the old cookies.

The cookie time period also functions to prevent the use of maliciously generated cookies. For example, a generation attack is an offensive operation where an external source issues request containing fake cookies. The fake cookies are generated outside web application server 410.

Web application identification 424 may also be concatenated to the cookie value. Web application identification 424 is a unique number related to a particular instance of a web application. Cookie 414 is linked to the particular installation of the web application by concatenating web application identification 424 to the cookie content. For example, where web application is an ecommerce application, no other ecommerce application is uniquely identified by web application identification 424. Web application identification 424 assures that even if cookie 414 has the same name as another cookie, the cookie content differs because of web application identification 424. As a result, cookies with the same name each remain associated with the unique information content of the cookie.

For example, where web application identification 424 is 0×1234abcd, web application server 410 modifies the cookie name to COOKIE_001="23: 2007-12-25 21 h:0× 1234abcd". Web application server 410 encodes cookie 414 onto edge server 404, sets the expiration time, and the response to the initial request is sent (step C).

Next, web application server 410 returns the response to client 402 through web server 408 and edge server 404 (step D). As the response is passed through edge server 404, the response is intercepted and cached in edge server cache 406. The cookies included in the response are used as cache keys or reference a particular cached object or set of data. In step E, client 402 issues the same request again but now cookie 414 is present in the request and the set of data included in the response becomes accessible to client 402 if the cookie in the response and the cookie cached are identical.

Edge server 404 finds the edge server cookies in the request, fetches cached output related to these cookies from edge server cache 406, interrupts the call, and sends the cached output to client 402 (step F) as a response. As a result, client 402 is able to quickly and efficiently access the data required for the request using cookie 414 without sending the request all the way to web application server 410.

Figure 5:
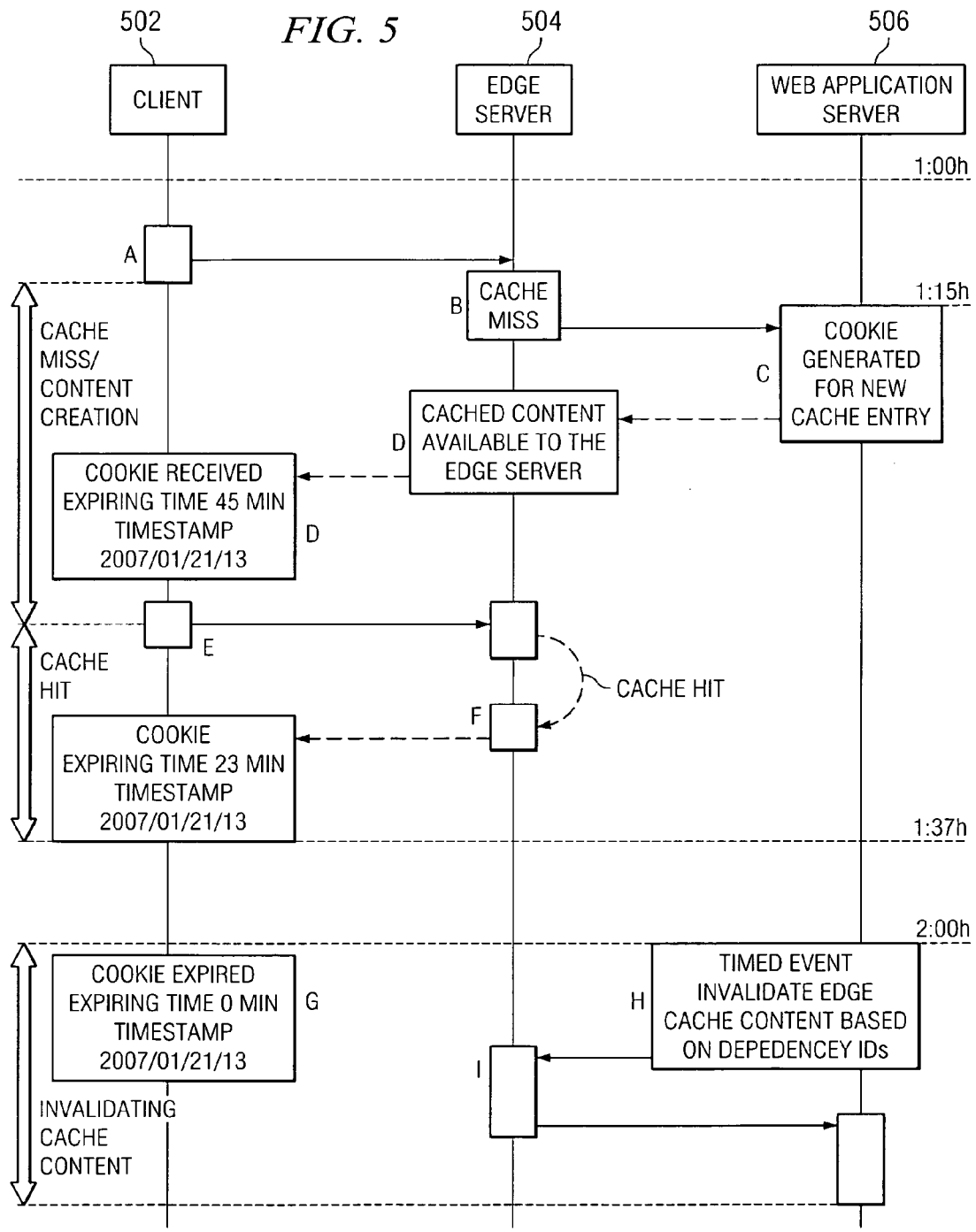
FIG. 5 is a flow diagram illustrating constrained caching in a network system in which aspects of the present invention may be implemented.

FIG. 5 is a flow diagram illustrating constrained caching in a network system in which aspects of the present invention may be implemented. Client 502, edge server 504, and web application server 506 may be elements of a network system, such as network system 400 of FIG. 4. Steps A-F, as described in FIG. 4, is further illustrated in FIG. 5. In step G, the cookie created in step C reaches the cookie expiration time which is the end of the active time period of the cookie. The web application server sends a command to edge server invalidating the edge cache content based on dependencies which may include the cookie expiration time (step H). The edge server invalidates the content and sends a message to web application server confirming content invalidation (step I). Future requests to edge server result in a cache miss and are passed to web application server. The invalidation is confirmed to web application server.

Figure 6:
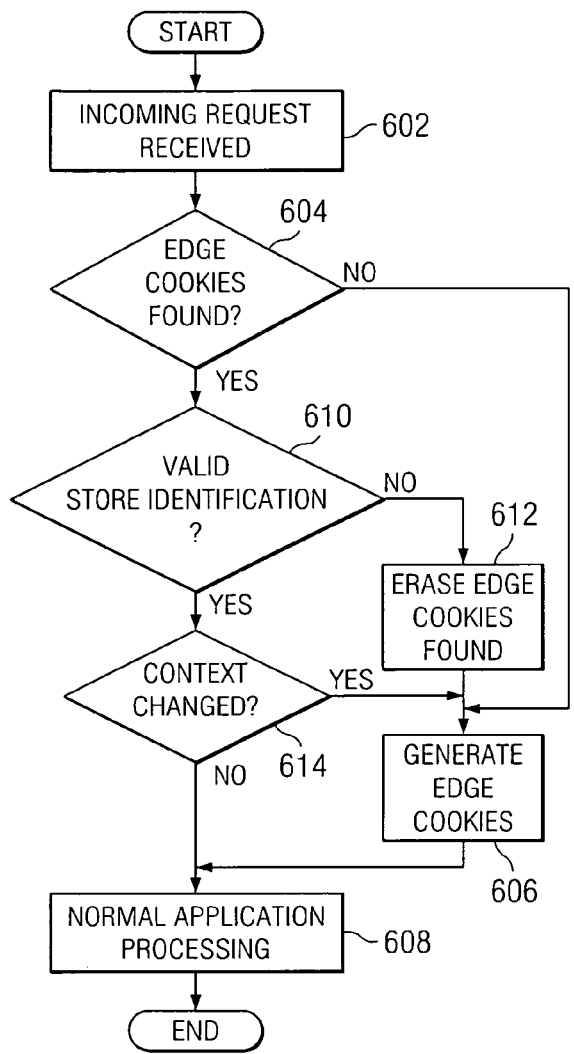
FIG. 6 is a flowchart illustrating an implementation of cookie management logic in accordance with an illustrative embodiment of the present invention.
Figure 7:
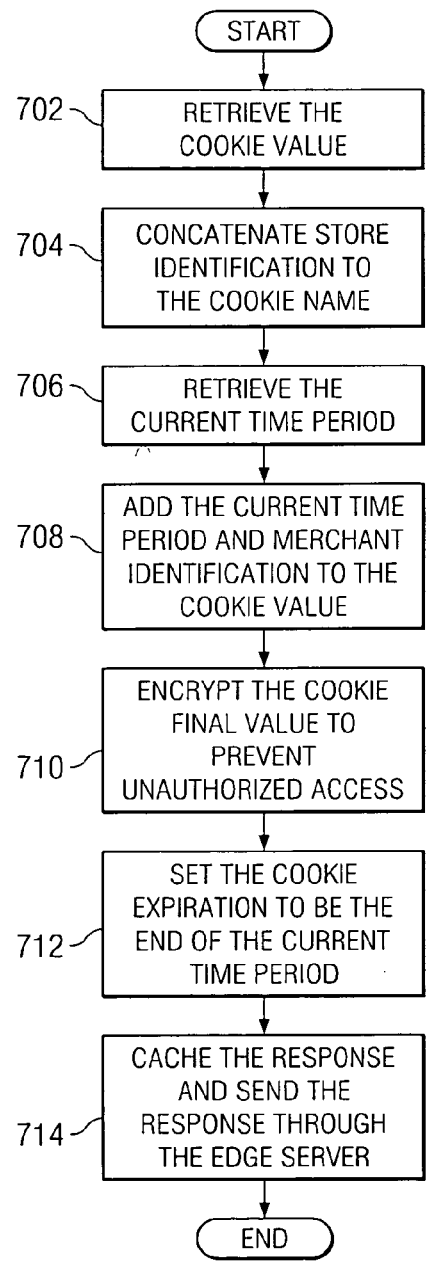
FIG. 7 is a flowchart illustrating cookie generation in accordance with an illustrative embodiment of the present invention.

FIG. 6 is a flowchart illustrating an implementation of cookie management logic in accordance with an illustrative embodiment of the present invention. The process of FIGS. 6 and 7 may be implemented by a web application server, such as web application server 410 of FIG. 4. FIGS. 6 and 7 may be implemented by a programming component, such as a request filter of the web application server. For example, the request filter may be a Java™ J2EE™ artifact executed before the application or the servlet containing the application logic is executed. Filters are Java™ components that allow on the fly transformations of payload and header information in both the request into a resource and the response from a resource. FIG. 6 illustrates specific logic which is executed before normal processing of an application is initiated. The process of FIG. 6 is one embodiment of the present invention as is not intended to limit other possible embodiments based on the current example.

The process or instructions of FIG. 6 begins with the web application server receiving a request (step 602). The request may be received from a client through or via an edge server, such as client 402 and edge server 404 of FIG. 4. The web application server determines if edge cookies are found (step 604). The determination of step 604 is used to determine whether edge cookies are present for processing or whether edge cookies need to be generated. Generated refers to initial generation of cookies based on a request or regeneration of cookies that are stale, meaning the expiration time is exceeded or the information contained in the cookie has changed.

If edge cookies are not found, the web application server generates edge cookies (step 606). The web application server next initiates normal application processing (step 608) with the process terminating thereafter. Normal application processing of step 608 may include executing the application code or executing a servlet. The servlet is an application program written in the Java™ programming language that is executed on a server with results being passed to a web browser of the client.

Turning back to step 604, if edge cookies are found, the web application server determines if the store identification is valid (step 612). The store identification is one example of an identifier, any type of unique identifiers may be used to distinguish cookies. For example, web application server may determine if the store identification of the identified cookies for a bookstore identify the book store in the store identification and not the music store.

If the store identification is not valid, the web application server erases the edge cookies found (step 612). For example, when a cookie name changes because a user moves between different store sections, the cookie may be set to expire immediately so that the cookie is effectively erased by being removed by the client browser. Next, the web application server generates edge cookies (step 606). In one example where only the cookie value has changed, the same cookie name may be used, but with the corrected cookie value.

If the cookies match and the store identifications are the same, the process determines if the context is changed (step 614). If the context is not changed, the response to the request is available on the edge server and the process initiates normal application processing (step 608) with the process terminating thereafter. If the context is changed in step 614, the request passes through the edge server to the web application server (step 606). In step 606, the request causes new cookies to be generated because the information stored on the edge server is not applicable. Returning to step 610, if the store identification is valid, the web application server determines if the cookie context is changed (step 614). If the context is not changed, the web application server initiates normal application processing (step 608) with the process terminating thereafter. If the context is changed in step 614, the web application server generates edge cookies (step 606). Cookie generation is required because the values originally placed in the cookies have changed. For example, at the original time of generation, the original language identification may have been Spanish, but in the meantime has changed to English. As a result, the user related data or context has changed and a new cookie needs to be generated. In another example, a user may have change her user profile requiring that a new cookie with new content be generated.

FIG. 7 is a flowchart illustrating cookie generation in accordance with an illustrative embodiment of the present invention. The process of FIG. 7 may be implemented by a web application server, such as web application server 410 of FIG. 4. The process depicted in FIG. 7 is a more detailed description of step 606 of FIG. 6 for initial cookie generating and regeneration. The process begins as the web application server retrieves the cookie value (step 702). The web application server then concatenates the store identification to the cookie name (step 704) and retrieves the current time period (step 706).

The web application server adds the current time period and the merchant identification to the cookie value (step 708). The web application server encrypts the cookie final value to prevent unauthorized access (step 710). The web application server then sets the cookie timeout to be the end of the current time period (step 712). The web application server caches the response and sends the response through the edge server (step 714) with the process terminating thereafter. The response includes the response to the request and the specialized cookie that is to be cached on the edge server.

FIG. 8 is pseudocode for the processes of FIGS. 6 and 7 in accordance with an illustrative embodiment of the present invention. Instructions 800 include section 802 and section 804. In these illustrative examples, section 802 may be used to implement the process of FIG. 6. Section 804 may be used to implement the process of FIG. 7.

Thus, the aspects of the present invention provide an improved method of cookie generation in order to control content on an intermediate server that caches data. In these examples, the server is an edge server. The method of the present invention compensates for lack of computation logic and identity verification mechanisms on the edge server by extending the cookies with system generated information. As a result, there is stronger coupling of data between data on the edge server and the web application server resulting in better protection of sensitive information and increased caching capabilities.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating cookies, the computer implemented method comprising:

generating a plurality of time periods, where each time period defines a duration of time during which data content of responses sent during the time period are valid;

responsive to receiving a request, retrieving a cookie value to fulfill the request;

retrieving a current time period during which the request is received from the plurality of time periods;

setting an expiration time for the cookie value based on an end of the retrieved current time period during which the request is received wherein the expiration time for the cookie value is calculated by subtracting a time at which the request is received from the end of the retrieved current time period;

adding a set of unique identifiers comprising the expiration time for the cookie value and a cookie name to form a cookie;

sending a response to the request through an intermediate server, wherein the response comprises data responsive to the request and the cookie, and wherein validity of the data in the response is related to the expiration time for the cookie value; and where sending the response to the request through the intermediate server comprises: synchronizing caching of the data in the response in a storage location associated with the intermediate server to form a set of cached data, wherein validity of the set of cached data is related to the expiration time for the cookie value after which the validity of the set of cached data is synchronized to expire.

2. The computer implemented method of claim 1, wherein the retrieving, setting, adding, and sending steps are performed by a web application server and further comprises: receiving the request from a client; determining whether the cookie is present in the request; responsive to the cookie being present, determining if the set of unique identifiers of the cookie is present in the request; and responsive to determining that the set of unique identifiers of the cookie is present in the request, initiating normal processing of an application.

3. The computer implemented method of claim 2, further comprising: responsive to determining that the cookie is not present in the request, initiating the retrieving, setting, adding, and sending steps.

4. The computer implemented method of claim 2, further comprising: responsive to determining that the set of unique identifiers of the cookie is not present in the request, erasing the cookie in the request; and initiating the retrieving, setting, adding, and sending steps.

5. The computer implemented method of claim 1, wherein the unique identifiers comprise at least one of a web application identification, a web application segment, a store identification, a merchant identification, and a language identification.

6. The computer implemented method of claim 1, further comprising: sending a command to the intermediate server instructing the intermediate server to invalidate the set of cached data from the storage location associated with the intermediate server in response to the expiration time for the cookie value.

7. The computer implemented method of claim 1, wherein synchronizing the caching of the data in the response in the storage location associated with the intermediate server to form the set of cached data further comprises: synchronizing usage of the cookie as a cache key to reference the data in the storage location associated with the intermediate server.

8. The computer implemented method of claim 1, further comprising: encrypting the cookie value for preventing unauthorized access.

9. The computer implemented method of claim 6, further comprising receiving a response from the intermediate server confirming invalidation of the set of cached data.

10. A computer system for generating cookies, the computer system comprising: a web application server operably connected to an intermediate server, wherein the web application server is configured to:

generate a plurality of time periods, where each time period defines a duration of time during which data content of responses sent during the time period are valid;

responsive to receiving a request, retrieve a cookie value to fulfill the request;

retrieve a current time period during which the request is received from the plurality of time periods;

set an expiration time for the cookie value based on an end of the retrieved current time period during which the request is received wherein the expiration time for the cookie value is calculated by subtracting a time at which the request is received from the end of the retrieved current time period;

add a set of unique identifiers comprising a cookie name and the cookie value comprising the expiration time for the cookie value to form a cookie;

send a response to the request through the intermediate server, where the response comprises data responsive to the request and the cookie, wherein validity of the data in the response is related to the expiration time for the cookie value; and wherein, in being configured to send a response to the request through the intermediate server, the web application server is configured to: synchronize caching of the data in the response in a storage location associated with the intermediate server to form a set of cached data, where validity of the set of cached data is related to the expiration time for the cookie value after which the validity of the set of cached data is synchronized to expire.

11. The computer system of claim 10, wherein the web application server is further configured to send a command to the intermediate server instructing the intermediate server to invalidate the set of cached data from the storage location associated with the intermediate server in response to the expiration time for the cookie value.

12. The computer system of claim 11, wherein the web application server is further configured to receive a response from the intermediate server confirming invalidation of the set of cached data.

13. A computer program product comprising a non-transitory computer usable storage medium including computer usable program code for generating cookies, the computer usable program code comprising:

computer usable program code for generating a plurality of time periods, where each time period defines a duration of time during which data content of responses sent during the time period are valid;

computer usable program code responsive to receiving a request for retrieving a cookie value to fulfill the request;

computer usable program code for retrieving a current time period during which the request is received from the plurality of time periods;

computer usable program code for setting an expiration time for the cookie value based on an end of the retrieved current time period in which the request is received wherein the expiration time for the cookie value is calculated by subtracting a time at which the request is received from the end of the retrieved current time period;

computer usable program code for adding a set of unique identifiers to a cookie name and the cookie value with the expiration time for the cookie value to form a cookie;

computer usable program code for sending a response to the request through an intermediate server, wherein the response includes data responsive to the request and the cookie, and wherein validity of the data in the response is related to the expiration time for the cookie value; and wherein the computer usable program code for sending the response to the request through the intermediate server comprises: computer usable program code for synchronizing caching the data in the response in a location associated with the intermediate server to form a set of cached data, wherein validity of the set of cached data is related to the expiration time for the cookie value after which the validity of the set of cached data is synchronized to expire.

14. The computer program product of claim 13, further comprising: computer usable program code for receiving the request from a client; computer usable program code for determining whether the cookie is in the request; computer usable program code responsive to finding the cookie for determining if the set of unique identifiers of the cookie are included in the request; and computer usable program code responsive to determining that the set of unique identifiers of the cookie is included in the request for allowing the client access to the set of data.

15. The computer program product of claim 13, further comprising computer usable program code for sending a command to the intermediate server instructing the intermediate server to invalidate the set of cached data from the storage location associated with the intermediate server in response to the expiration time for the cookie value.

16. The computer program product of claim 13, further comprising computer usable program code for encrypting the cookie value for preventing unauthorized access.

* * * * *